З,255,140
SILOXANE HEAT SENSITIZING AGENTS FOR LATEX MIXTURES
Gustav Sinn, Bergisch-Neukirchen, Heinz Hornig, Cologne, and Walter Simmler, Cologne-Mulheim, Germany, assignors to Farbenfabriken Bayer Aktiengesellschaft, Leverkusen, Germany, a German corporation
No Drawing. Filed Oct. 16, 1962, Ser. No. 230,990
Claims priority, application Germany, Oct. 17, 1961, F 35,154
5 Claims. (Cl. 260—29.6)

This invention relates to heat sensitive latex mixtures and to new heat sensitisers for latices.

It is known that very thick-walled articles produced by immersion may be obtained with the use of hot forms and so-called heat sensitively adjusted mixtures of natural latex and synthetic latex by immersing the hot forms into these mixtures. The heat sensitive latex mixtures have the property that when they are heated to a certain temperature which depends on the type of heat sensitiser they coagulate to form a closed film. Known heat sensitisers are polyvinyl methyl ether, polygylcol ether and polyether thioether.

It is an object of the present invention to provide new heat sensitizers for latices. Another object is to provide heat sensitizers which have a relative high coagulation point. Other objects will appear hereinafter.

It has now been found that a heat sensitive adjustment of natural latex and synthetic latices and their vulcanisable mixtures may be obtained by the addition of a functional siloxane of the general formula $$R_nSiO_{4-n/2}$$

wherein $n$ represents a number between 1.8 to 3, inclusive, preferably 1.9 to 2.5 and wherein R can have one of the following significances:

(1) R represents a methyl or phenyl radical;
(2) R represents a polyoxy lower alkylene radical;
(3) R represents a carbo-functional radical of the formula $$—R_1—X—R_2—R_3$$

wherein $R_1$ represents a lower alkylene radical, X represents a hetero atom such as O, S or NY, wherein Y represents hydrogen or a lower alkyl radical, $R_2$ represents a lower alkylene group or a polyoxy lower alkylene group and if X represents NY then $R_2$ can represent additionally a poly lower alkylene amine radical, and $R_3$ represents hydrogen or a hydroxy or lower alkoxy group and, if $R_2$ represents a poly lower alkylene amine radical, furthermore an amino group or lower alkyl substituted amino group.

The compounds used according to the invention contain at the most one radical enumerated above under 2 and 3 per one Si atom, but the compounds contain in the molecule at least one of the radicals enumerated under 2 and 3 in the definition of R. The remaining radicals are those which are enumerated under 1, that means they are methyl or phenyl radicals.

The mixtures used according to the invention have a fixed coagulation point, i.e., the mixtures coagulate spontaneously on being heated to a certain temperature. In these mixtures, no coagulation occurs even after long storage at temperatures below the coagulation point. When hot forms are introduced into such mixtures, the mixtures coagulate to a solid film on the form, and this method may be used particularly for making thick-walled articles very rapidly with short immersion times.

Examples of the functional siloxanes are the following compounds:

(I) Si-functional siloxanes consisting of copolymers of units of the type A together with siloxane units which have alkoxy groups bound directly to the Si atoms.

The units of type A are the following siloxane units:

[(CH$_3$)$_3$SiO$_{1/2}$] [(CH$_3$)$_2$SiO] [CH$_3$SiO$_{3/2}$] [(C$_6$H$_5$)$_2$SiO] [C$_6$H$_5$SiO$_{3/2}$]

Examples of siloxane units which have the alkoxy groups bound directly to the Si atoms are the following:

[RO(R')$_2$SiO$_{1/2}$] [RO(R')SiO] [(RO)$_2$R'SiO$_{1/2}$]

in which R' represents methyl or phenyl and R represents a lower alkyl radical such as methyl, ethyl, propyl or a butyl radical or ω-hydroxy- or ω-alkoxy-polyhydroxy alkylene radicals such as (—C$_n$H$_{2n}$O—)$_m$H or $$(—_nH_{2n}O—)_mR$$

$n$ represents, for example, a whole number from 2 to 6 and $m$ represents a whole number from 1 to 150, and wherein R is e.g., again a lower alkyl radical.

Examples of such compounds are:
(1) [(C$_2$H$_5$O)$_2$SiC$_6$H$_5$]$_2$O
(2) C$_2$H$_5$O[(CH$_3$)Si(OC$_2$H$_5$)O]$_5$C$_2$H$_5$
(3) [CH$_3$SiO$_3$] [(CH$_3$)$_2$SiO]$_{20}$
                                   ([C$_2$H$_4$O]$_{4.3}$[C$_3$H$_6$O]$_3$C$_4$H$_9$)$_3$
(4) CH$_3$—CH$_2$—C(CH$_2$O)$_3$ ([(CH$_3$)$_2$SiO]$_{10}$
                                 [C$_2$H$_4$O]$_9$ [C$_3$H$_6$O]$_3$CH$_3$)$_3$ Remarks on Compounds 3 and 4:

The hydroxy ethylene- and hydroxy propylene radicals may be present in statistical distribution instead of as graft polymers; oxy-i-propylene may be present instead of oxy propylene.

(II) C-functional siloxanes consisting of copolymers of the units of type A together with those which have alkoxy- or amino groups bound to the siloxane radical through carbon, e.g.,

[X—R—O(CH$_2$)$_n$Si(CH$_3$)$_2$O$_{1/2}$]
                                   [X—R—O(CH$_2$)$_n$Si(CH$_3$)O]

in which X represents H, OH or OR' where R' represents a lower alkyl radical such as ethyl, propyl, i-propyl, butyl or i-butyl radicals and R represents lower alkylene, e.g. propylene, i-propylene, butylene or i-butylene radicals or a polyoxy alkylene radical, e.g. (C$_n$H$_{2n}$O)$_m$ wherein $n$ is a whole number from 2 to 6 and $m$ is a whole number from 1 to 150. Additional siloxane units, which are amino-functional, are

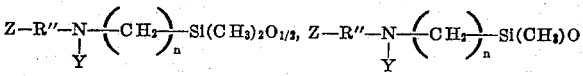

where Y represents H or R', Z represents H, NH$_2$, NHR', NR'$_2$, OH and OR', where R' has the meaning given above and R'' represents a lower alkylene radical or a poly lower alkylene amino radical, e.g.

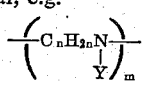

where $n$, $m$ and Y have the meaning given above.

Examples of such compounds are:

(1) $HO(C_4H_8)O-CH_2(CH_3)_2SiO[(CH_3)_2SiO]_{10}$
    $Si(CH_3)_2-O(C_4H_8)OH$
(2) $[HO(C_3H_6)O(C_3H_6)O-CH_2-Si(CH_3)_2]_2$
    $O[(CH_3)_2SiO]_{10}$
(3) $[(CH_3)_3SiO_{1/2}]_2([(CH_3)_2SiO]_3[(CH_3)$
    $Si(CH_2OC_4H_8OH)O])_{10}$
(4) $[CH_3SiO_3][(CH_3)_2SiO]_{20}[(CH_3)_2Si-CH_2O$
    $(C_2H_4O)_{4.3}(C_3H_7O)_3C_4H_8]_3$
(5) $NH_2-C_2H_4-NH-CH_2-(CH_3)_2SiO[(CH_3)_2$
    $SiO]_{10}Si(CH_3)_2-CH_2-NH-C_2H_4-NH_2$
(6) $[(CH_3)_3SiO_{1/2}]_2([(CH_3)_2SiO]_3[(CH_3)$
    $Si(CH_2N(CH_3)C_2H_4OH)O])_{10}$
(7) $[CH_3SiO_3][(CH_3)_2SiO]_{20}[(CH_3)_2Si-CH_2$
    $-NH-C_2H_4-NH-C_2H_4-NH_2]_3$
(8) $(C_2H_5)_2N-CH_2-Si(CH_3)_2O-Si$
    $(CH_3)_2-CH_2-N(C_2H_5)_2$
(9) $[NH_2-C_2H_4-NH(CH_2)_3-Si(CH_3)_2]_2$
    $O[(CH_3)_2SiO]_{10}$

The functional siloxanes may be water-soluble or water-insoluble siloxanes, but it is preferable to use the water-soluble compounds.

Besides natural latex, latices of synthetic rubber-like polymers may also be used, for example those obtained from conjugated diolefines, e.g. butadiene, dimethyl butadiene and isoprene and their homologues and copolymers of such conjugated diolefines with polymerisable vinyl compounds, e.g., styrene, α-methyl styrene and their substitution products, acrylonitrile, methacrylonitrile and similar polymers or copolymers which may be obtained from iso-olefines, e.g., isobutylene and its homologues, in some cases with small quantities of conjugated diolefines. It is also suitable to use latices of polymers which have been obtained from chlorobutadiene or its copolymers with mono- and/or diolefines or polymerisable vinyl compounds. The usual additives, e.g., fillers, may be added to these latices.

It is generally sufficient to add 0.5 to 10% by weight of the mixture of siloxanes calculated on the dry weight of the polymer.

These mixtures may be used in known processes for making formed articles and for spraying rubber threads by allowing the mixture to flow through externally heated capillary tubes.

Heat sensitive mixtures generally have a coagulation point of 30 to 35° C. The mixtures prepared with the siloxanes according to the invention have a coagulation point of about 45° C., so that they may be stored at higher room temperatures and are suitable for making thin-walled articles by immersion.

*Example 1*

167.00 parts by weight of 60% natural latex
       (=100 parts by weight of dry natural rubber)
  2.00 parts by weight of
$[CH_3SiO_3][(CH_3)_2SiO]_{20}([C_2H_4O]_{4.3}$
       $[C_3H_6O]_3C_4H_9)_3$
       dissolved in 4.00 parts by volume of water
  0.25 parts by weight of zinc oxide
  0.80 parts by weight of sulfur
  1.00 part by weight of zinc
       dimethyl dithiocarbaminate            *

Coagulation point: 47° C.

*Dispersed in 3.95 parts by volume of 5% aqueous solution of a condensation product of sodium naphthalene sulfonate with formaldehyde.

*Example 2*

200.00 parts by weight of 2-chlorobutadiene
       methacrylic acid copolymer latex (50%)
       (=100 parts by weight of 2-chlorobutadiene
       methacrylic acid copolymer, dry)
  4.00 parts by weight of
$[CH_3SiO_3][(CH_3)_2SiO]_{20}((CH_3)_2Si-CH_2-O$
       $[C_2H_4]_{4.3}[C_3H_6O]_3C_4H_9)_3$
       dissolved in 8.00 parts by volume of water
  0.25 parts by weight of zinc oxide
  0.80 parts by weight of sulfur                *
  1.00 part by weight of zinc dimethyl dithiocarbamate
  1.00 part by weight of 2-mercpato benzimidazole (dispersed in 3.00 parts by volume of a 5% aqueous solution of a condensation product of sodium methylene di-naphthalene sulfonate)

Coagulation point: 48° C.

*Dispersed in 3.95 parts by volume of a 5% aqueous solution of a condensation product of sodium methylene di-naphthalene sulfonate.

Similar results are obtained if instead of the above siloxane the following is used:

$[CH_3SiO_3][(CH_3)_2SiO]_{15}((CH_3)_2Si-CH_2-S$
       $-[C_2H_4O]_3[C_3H_6O]_2OH)_3$

*Example 3*

210.00 parts by weight of acrylonitrile methacrylic acid copolymer latex (47%) (=100 parts by weight of acrylonitrile methacrylic acid copolymer)
  3.00 part by weight of
$[CH_3SiO_3][(CH_3)_2SiO]_{20}([C_2H_4O]_{4.3}$
       $[C_3H_6O]_3C_4H_9)_3$
       dissolved in 6.00 parts by volume of water
  5.00 parts by weight of zinc oxide dispersed in 5.00 parts by volume of a 5% aqueous solution of a condensation product of sodium methylene dinaphthalene sulfonate
  1.00 part by weight of 2-mercapto benzimidazole dispersed in 3.00 parts by volume of a 5% aqueous solution of a condensation product of sodium methylene di-naphthalene sulfonate Coagulation point: 48° C.

*Example 4*

167.00 parts by weight of butadiene styrene copolymer latex (60%)
       (=100 parts by weight of butadiene styrene copolymer)
  4.00 parts by weight of
$[CH_3SiO_3][(CH_3)_2SiO]_{20}((CH_3)_2Si-CH_2-O-$
       $[C_2H_4O]_{4.3}[C_3H_6O]_3C_4H_9)_3$
       dissolved in 8.00 parts by volume of water
  1.00 part by weight of ammonium chloride dissolved in 20 parts by volume of water
  2.50 parts by weight of sulfur
  2.50 parts by weight of zinc oxide           *
  0.80 part by weight of zinc dimethyl dithiocarbamate
  1.00 part by weight of 2-mercapto benzimidazole     †

Coagulation point: 48° C.

* Dispersed in 12.2 parts by volume of a 5% aqueous solution of a condensation product of sodium methylene di-naphthalene sulfonate.
† Dispersed in 3.00 parts by volume of a 5% aqueous solution of a condensation product of sodium methylene di-naphthalene sulfonate.

*Example 5*

167.00 parts by weight of 60% natural latex
       (=100 parts by weight of dry natural rubber)
  2.00 parts by weight of a mixture of the following composition:
       (a) 90% by weight of

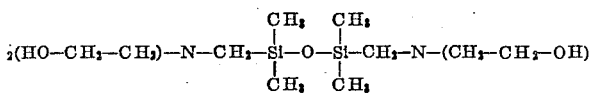

(b) 8% by weight of
$[CH_3SiO_3][(CH_3)_2SiO]_{20}([C_2H_4O]_{4.3}[C_3H_6O]_3C_4H_9)_3$ (c) 2% by weight of a linear dimethyl polysiloxane having a viscosity of 100 cp. (at 25° C.)

0.25 part by weight of zinc oxide  
0.80 part by weight of sulfur  
1.00 part by weight of zinc dimethyl dithiocarbamate }*

Coagulation point: 48° C.

* Dispersed in 3.95 parts by volume of 5% aqueous solution of a condensation product of sodium naphthalene sulfonate with formaldehyde.

Example 6

167.00 parts by weight of 60% natural latex  
(=100 parts by weight of dry natural rubber)  
2.00 parts by weight of a mixture of the following composition:

(a) 90% by weight of

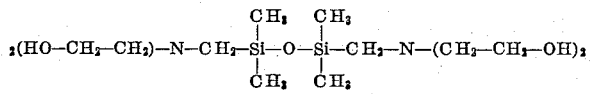
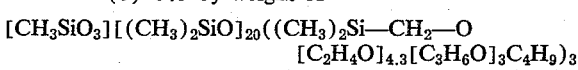

(b) 8% by weight of $[CH_3SiO_3][(CH_3)_2SiO]_{20}((CH_3)_2Si-CH_2-O$  
$[C_2H_4O]_{4.3}[C_3H_6O]_3C_4H_9)_3$ (c) 2% by weight of a linear dimethyl polysiloxane having a viscosity of 100 cp. (at 25° C.).

0.25 part by weight of zinc oxide  
0.80 part by weight of sulfur  
1.00 part by weight of zinc dimethyl dithiocarbamate }*

Coagulation point: 40° C.

* Dispersed in 3.95 parts by volume of 5% aqueous solution of a condensation product of sodium naphthalene sulfonate with formaldehyde.

Example 7

167.00 parts by weight of 60% natural latex  
(=100 parts by weight of dry natural rubber)  
2.00 parts by weight of a mixture of the following composition:

(a) 90% by weight of

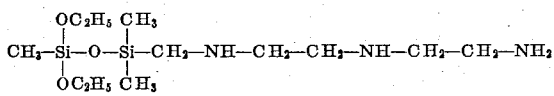
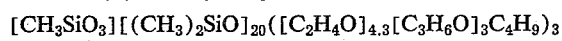

(b) 8% by weight of $[CH_3SiO_3][(CH_3)_2SiO]_{20}([C_2H_4O]_{4.3}[C_3H_6O]_3C_4H_9)_3$ (c) 2% by weight of a linear dimethyl polysiloxane having a viscosity of 100 cp. (at 25° C.).

0.25 part by weight of zinc oxide  
0.80 part by weight of sulfur  
1.00 part by weight of zinc dimethyl dithiocarbamate }*

Coagulation point: 70° C.

* Dispersed in 3.95 parts by volume of 5% aqueous solution of a condensation product of sodium naphthalene sulfonate with formaldehyde.

Example 8

167.00 parts by weight of 60% natural latex  
(=100 parts by weight of dry natural rubber)  
2.00 parts by weight of a mixture of the following composition:

(a) 90% by weight of

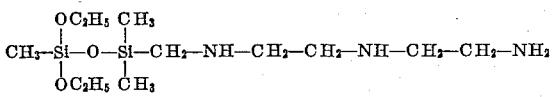
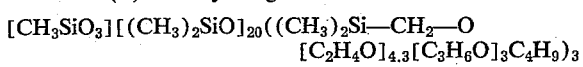

(b) 8% by weight of $[CH_3SiO_3][(CH_3)_2SiO]_{20}((CH_3)_2Si-CH_2-O$  
$[C_2H_4O]_{4.3}[C_3H_6O]_3C_4H_9)_3$ (c) 2% by weight of a linear dimethyl polysiloxane having a viscosity of 100 cp. (at 25 °C.).

0.25 part by weight of zinc oxide  
0.80 part by weight of sulfur  
1.00 part by weight of zinc dimethyl dithiocarbamate }*

Coagulation point: 70° C.

* Dispersed in 3.95 parts by volume of 5% aqueous solution of a condensation product of sodium naphthalene sulfonate with formaldehyde.

We claim:

1. In the process for the manufacture of a heat-sensitive latex, the improvement which comprises incorporating into the latex as heat sensitiser 0.5–10% by weight of a functional siloxane of the general formula

wherein $n$ represents a number between 1.8 to 3, inclusive, and wherein R represents a radical selected from the group consisting of (1) a methyl or a phenyl radical;  
(2) a polyoxy lower alkylene radical;  
(3) a carbo-functional radical of the formula

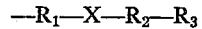

wherein $R_1$ represents a lower alkylene radical, X represents a hetero atom selected from the group consisting of O, S and NY, Y represents a member selected from the group consisting of hydrogen and a lower alkyl radical, $R_2$ represents a member selected from the group consisting of a lower alkylene radical and a polyoxy lower alkylene radical, and $R_2$ further represents a poly lower alkylene amine radical when X represents NY, $R_3$ represents a member selected from the group consisting of a hydroxy and lower alkoxy radical, and when $R_2$ is a poly lower alkylene amine radical, $R_3$ is a member selected from the group consisting of an amino group and lower alkyl-substituted amino group, said functional siloxane containing at the most one radical enumerated above under 2 and 3 per one Si atom and said siloxane containing at least one of the radicals enumerated above under 2 and 3; said latex being the latex of a rubbery polymer selected from the group consisting of natural rubber, a homopolymer of a conjugated diene, a copolymer of a conjugated diene with a copolymerizable vinyl monomer, polyisobutylene, a copolymer of isobutylene with a copolymerizable vinyl monomer, polychlorobutadiene, and a copolymer of chlorobutadiene with a copolymerizable vinyl monomer.

2. Process of claim 1 which comprises using as the siloxane $[CH_3SiO_3][(CH_3)_2SiO]_{20}([C_2H_4O]_{4.3}[C_3H_6O]_3C_4H_9)_3$ 3. Process of claim 1 which comprises using as the siloxane $[CH_3SiO_3][(CH_3)_2SiO]_{20}((CH_3)_2Si-CH_2-O$  
$[C_2H_4O]_{4.3}[C_3H_6O]_3C_4H_9)_3$ 4. Process of claim 1 which comprises using as the siloxane $[CH_3SiO_3][(CH_3)_2SiO]_{15}((CH_3)_2Si-CH_2-S-$  
$[C_2H_4O]_3[C_3H_6O]_2OH)_3$ 5. A latex containing 0.5–10% by weight of a functional siloxane of the general formula

wherein $n$ represents a number between 1.8 to 3, inclusive, and wherein R represents a radical selected from the group consisting of (1) a methyl or a phenyl radical;  
(2) a polyoxy lower alkylene radical;  
(3) a carbo-functional radical of the formula

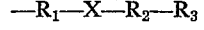

wherein $R_1$ represents a lower alkylene radical, X represents a hetero atom selected from the group consisting of O, S and NY, Y represents a member selected from the group consisting of hydrogen and a lower alkyl radical, $R_2$ represents a member selected from the group consisting of a lower alkylene radical and a polyoxy lower alkylene radical, and $R_2$ further represents a poly lower alkylene amine radical when X represents NY, $R_3$ represents a member selected from the group consisting of a hydroxy and lower alkoxy radical, and when $R_2$ is a poly lower alkylene amine radical, $R_3$ is a member selected from the group consisting of an amino group and lower alkyl-substituted amino group, said functional siloxane containing at the most one radical enumerated above under 2 and 3 per one Si atom and said siloxane containing at least one of the radicals enumerated above under 2 and 3; said latex being the latex of a rubbery polymer selected from the group consisting of natural rubber, a homopolymer of a conjugated diene, a copolymer of a conjugated diene with a copolymerizable vinyl monomer, polyisobutylene, a copolymer of isobutylene with a copolymerizable vinyl monomer, polychlorobutadiene, and a copolymer of chlorobutadiene with a copolymerizable vinyl monomer.

References Cited by the Examiner
UNITED STATES PATENTS

| | | | |
|---|---|---|---|
| 2,389,802 | 11/1945 | McGregor | 260—46.5 |
| 2,875,177 | 2/1959 | Bluestein | 260—448.2 |
| 3,032,577 | 5/1962 | Morehouse | 260—448.2 |
| 3,061,567 | 10/1962 | Keil | 260—46.5 |
| 3,121,069 | 2/1964 | Dietz | 260—827 |

FOREIGN PATENTS 860,327  2/1961  Great Britain.

MURRAY TILLMAN, *Primary Examiner.*

N. F. OBLON, *Assistant Examiner.*